June 16, 1953     H. BRETTHAUER     2,641,955
FOCUSING HOOD FOR PHOTOGRAPHIC CAMERAS
Filed Feb. 8, 1951     3 Sheets-Sheet 2

INVENTOR,
Hermann Bretthauer
BY Charles Shepard
ATTORNEY

Patented June 16, 1953

2,641,955

UNITED STATES PATENT OFFICE 2,641,955

FOCUSING HOOD FOR PHOTOGRAPHIC CAMERAS

Hermann Bretthauer, Braunschweig, Germany, assignor to Franke & Heidecke, Fabrik Photographischer Präzisions-Apparate, Braunschweig, Germany, a firm of Germany Application February 8, 1951, Serial No. 209,970
In Germany March 3, 1949

6 Claims. (Cl. 88—1.5)

The present invention relates to a focusing hood for photographic cameras, especially for cameras of the type having a focusing view finder.

An object of the invention is the provision of a generally improved and more satisfactory focusing hood, so designed and constructed as to be capable of use as a direct view finder, in addition to use for viewing the image on a ground glass plate or other focusing screen, and also so designed and constructed as to enable the user to observe all or a portion of the focusing screen under magnification, for more accurate focusing purposes, both when using the focusing hood in the normal way by downward observation, and when using the focusing hood as a direct view finder at eye level.

Another object of the invention is the provision of a simple and economical structure whereby the front wall of the focusing hood may be opened to provide an aperture for the direct view finder, when desired, and will stay in its open position as long as desired, and may be quickly closed by simple manipulation whenever it is desired to focus by downward viewing onto the focusing screen, rather than by direct viewing at eye level.

A further object is the provision of an auxiliary mirror for viewing the portion of the focusing screen when the focusing hood is used as a direct view finder, so mounted and controlled that this auxiliary mirror may be quickly brought to proper viewing position and will automatically return to its normal out-of-use position when the parts are readjusted for vertical viewing rather than for use as a direct view finder.

Figure 1:
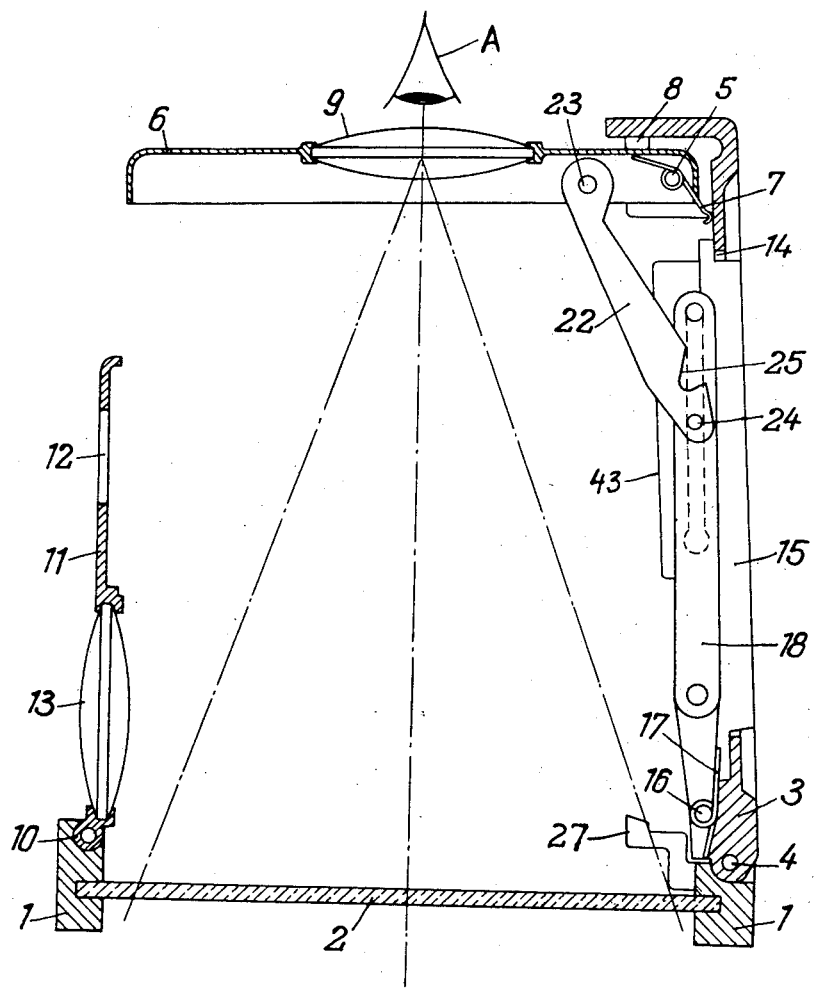
Figure 2:
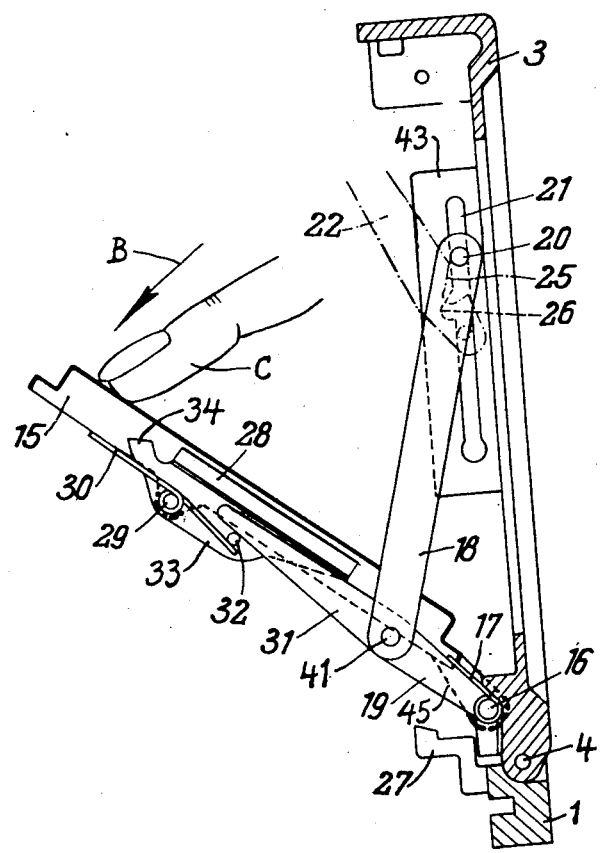
Figure 3:
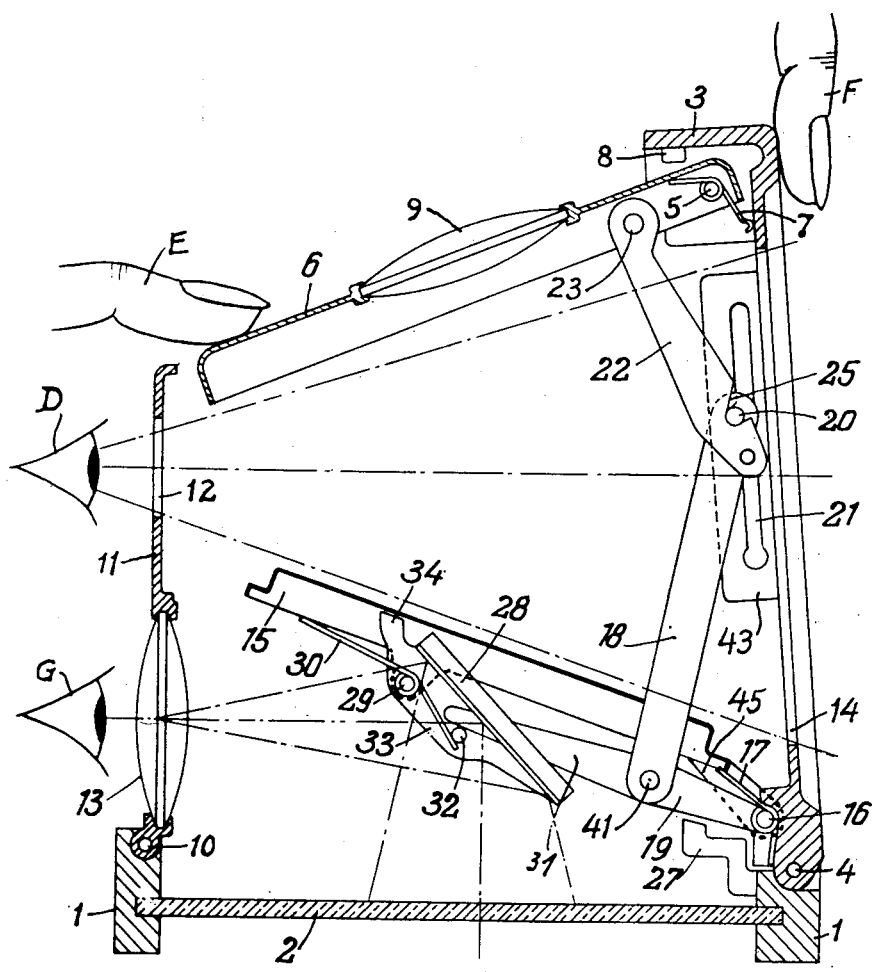

These and other desirable objects may be attained in the manner disclosed as an illustrative embodiment of the invention in the following description and in the accompanying drawings forming a part hereof, in which:

Fig. 1 is a somewhat diagrammatic or schematic vertical section through a focusing hood in accordance with the present invention, with certain parts omitted for the sake of clarity, showing the structure in its erected or open position for vertical viewing of the focusing screen, and with a magnifying lens in position for magnification of the focusing screen for more accurate focusing;

Fig. 2 is a vertical section similar to a fragment of Fig. 1, showing a front wall panel of the focusing hood being moved to an open position to prepare the focusing hood for use as a direct view finder; and Fig. 3 is a view similar to Fig. 1 with the parts moved in position for direct view finding and with the auxiliary mirror in its effective position for observing, under magnification, a portion of the focusing screen, to accomplish more accurate focusing.

The same reference numerals throughout the several views indicate the same parts.

Since focusing hoods in general are well known, it is believed unnecessary to illustrate or describe a complete hood, and the present illustration and description will be confined mainly to those features by which the hood of the present invention differs from the conventional focusing hood. In the conventional hood there is, as here, a horizontally arranged rectangular frame 1 either formed as part of or securely fixed to the top of the camera body, which frame contains the horizontal focusing screen 2, of ground glass or any other suitable construction. The hood normally comprises a series of walls hinged to the frame 1 and to each other in such a way that all the walls can be folded down approximately flat across the top of the focusing screen 2 when the hood is not in use, and may be unfolded or opened up or erected to form a front wall, a back or rear wall, and two side walls for constituting a shadow box rising from the top of the focusing screen 2, when the camera is to be used. This much is true of the present construction as well as the prior art. The side walls of the hood, in the present construction, are not illustrated in the drawings, as they may be the same as in the prior art. The front and back walls are here illustrated, but in a somewhat diagrammatic or schematic way, sufficient to disclose the present invention without going into unnecessary or well-known details.

The front wall of the focusing hood is indicated in general at 3, and its lower edge is hinged to the front edge of the frame 1 at the hinge 4. In Fig. 1, this front wall 3 is shown in its normal erected position. As above indicated, when the camera is not in use, the front wall and all of the other walls are folded down substantially flat across the top of the focusing screen 2.

Near the upper edge of the front wall 3 is a hinge 5, on which is hinged a cover plate 6 pressed upwardly by a spring 7 against a stop or abutment 8, in which position a magnifier lens 9 carried by the cover plate 6 is substantially over the center of the focusing screen 2, so that the user's eye may be placed in a position indicated diagrammatically at A and may observe, through the lens 9, a magnified image of the focusing screen 2 with the image of the field of view of the camera appearing thereon. This magnification of the image on the focusing screen is helpful in achieving accurate focusing under conditions where focusing is critical. If the image on the focusing screen 2 is to be observed by the naked eye without magnification, then the cover 6 is simply folded down about its hinge 5 until it assumes a vertical position on the rear side of the front wall 3, out of the way of direct downward viewing of the focusing screen by the naked eye, and it is held in such position by a suitable catch.

On another hinge 10 at the rear edge of the frame 1 is hinged the rear wall or back wall 11 of the focusing hood. This rear wall 11 is normally of lesser height than the front wall 3, as well seen in Fig. 1, in order to facilitate folding of the walls to their collapsed position. Hence the cover plate 6 when in its horizontal position illustrated, stands at a substantial height above the top edge of the rear wall, but the resulting gap or open space does not matter when the hood is used for normal downward viewing, because the head of the observer sufficiently screens or shields the opening to prevent excessive entrance of light. In this back wall 11 there is a small sight aperture 12 which, in conjunction with a companion sight aperture of larger dimensions in the front wall 3, may be used as a direct view finder (sometimes called an iconometer) for direct horizontal viewing of the field of view of the camera when held at eye level. Directly below but fairly close to this aperture 12, the rear wall 11 is provided with a second aperture in which is mounted a magnifying lens 13 for viewing a portion of the focusing screen 2 under magnification, by means of an auxiliary mirror, the lens 13 being placed relatively close to the aperture 12 so that the user's eye may be quickly shifted back and forth from the aperture 12 to the lens 13.

For the front aperture of the direct view finder, a relatively large aperture 14 is formed in the front wall 3, and is normally closed by a wall or panel 15 when the structure is not being used as a direct view finder. This panel 15 is mounted on arms (not shown) which swing on the hinge shaft 16 which, in turn, is mounted on the front wall 3 near the bottom edge thereof. A spring 17 tends to swing the panel 15 forwardly and upwardly to its closed position relative to the aperture 14. But by exerting rearward finger pressure in the direction of the arrow B (Fig. 2) as shown diagrammatically by the finger C, the entire panel 15 may be swung backwardly and downwardly about its pivot or hinge 16 against the action of the spring 17, thus opening up the front aperture 14 of the direct view finder. When the panel 15 is thus swung backwardly and downwardly, it pulls downwardly on a link 18, the lower end of which is pivoted at 41 to a lever 19 pivoted on the hinge shaft 16 and lying behind the panel 15 so that the lever 19 swings down with the panel. The upper end of this link 18 carries a pin 20 which slides upwardly and downwardly in a slot 21 formed in a flange 43 which is mounted on and extends rearwardly from the front wall 3.

Another link 22 is pivoted at its upper end, at 23, to the cover plate 6, and its lower end carries a pin 24 which likewise slides in the same slot 21, below the pin 20. Formed in the front edge of this link 22, a little above the pin 24, is a notch 25. In the rear edge of the slot 21, intermediate its length, is the notch 26. These notches 25 and 26 are so shaped and so related to each other that as the closure panel 15 is turned rearwardly and downwardly, the pin 20 (which projects into the plane of the link 22 as well as into the slot 21) contacts with the lower edge of the slot 25 in the link 22 and pulls the link downwardly to pull the cover plate 6 downwardly from the initial position shown in Fig. 1. About the time that the panel 15 reaches its proper position for use as a direct view finder (a position just below the line of sight from the aperture 12 through the aperture 14) the pin 20 engages in the notch 26 of the slot 21, and seats itself also in the bottom of the notch 25 of the link 22. The slope of the upper edge of the notch 26 is such that the upward pressure of the spring 17 will not, of itself, be able to push the pin 20 out of the notch 26, and so the panel 15 will remain in its depressed position (as shown in Fig. 3) as long as desired. This will simultaneously hold the top cover plate 6 in its slightly depressed position as also seen in Fig. 3, wherein the rear edge of the cover plate 6 is close to the top edge of the back wall 11, to prevent entrance of excess light which might otherwise interfere with most satisfactory use of the direct view finder. In these positions, the cover plate 6 is just above the top of the line of sight through the apertures 12 and 14, and the closure panel 15 is just below the bottom of the line of sight, so that these members do not interfere with the full use of the direct view finder when the operator places his eye in the location indicated at D in Fig. 3, where he may look horizontally forwardly through the small aperture 12 and see the field of view of the camera framed by the aperture 14.

The release of the pin 20 from the notch 26, to enable restoration of the panel 15 to its closed position with respect to the aperture 14, may be accomplished in either one of two ways. First, downward finger pressure may be applied to the rear edge of the cover plate 6, as indicated diagrammatically by the finger E in Fig. 3. This downward movement of the cover plate 6 will cause downward movement of the link 22, and the upper edge of the notch 25 therein will act as an inclined cam on the pin 20, forcing the pin 20 forwardly out of the notch 26, so that the pin may now slide up the slot 21 and the spring 17 may restore the panel 15 upwardly and forwardly to its closed position shown in Fig. 1. Then upon release of the finger pressure E, the spring 7 will restore the cover plate 6 upwardly to its position determined by the stop or abutment 8, as in Fig. 1. The second way in which the pin 20 may be released from the notch 21 is to apply rearward pressure to the upper edge of the front wall 3, as shown diagrammatically by the finger F in Fig. 3. This will swing the entire front wall structure, and all parts carried by it, rearwardly or counterclockwise about the hinge 4 of the front wall structure, until the arm 19 comes down against the fixed stop 27 which will prevent further downward movement of the arm 19 and thus will apply additional upward pressure to the link 18, forcing the pin 20 out of the notch 26 and into the straight part of the slot 21, so that, just as before, the spring 17 will restore the panel 15 forwardly and upwardly to its closed position, and the upward motion of the pin 20 will release the link 22 and allow it to be restored upwardly.

While the use of the direct view finder (apertures 12 and 14) will enable the operator to determine the field of view of the camera, it will not, by itself, enable the operator to determine whether or not the camera is properly focused upon the principal object in that field of view. Consequently it is desirable that the operator be able also to see the sharpness of the image on the focusing screen 21, in order to focus the camera upon the desired objects with accuracy. To this end, there is mounted on the under side of the panel 15 a small auxiliary mirror 28 which normally lies closely against the rear side of the panel 15, and parallel thereto, as in Fig. 2, so as to be out of the way when viewing from above downwardly onto the focusing screen 2. But when the panel 15 is swung down to its open position for enabling use of the direct view finder, then the mirror 28 is tilted relatively to the panel 15 about the pivotal axis 29, against the force of a spring 30 which tends to hold the mirror parallel to the panel 15. This tilting is preferably accomplished automatically by an extension 31 on the lever 19, which engages a pin 32 on the mirror carrier or frame 33, the parts being so arranged that as the panel 15 swings down, the arm 19 and its extension 31 swing down with it, until the pin 20 engages in the notch 26. Then the downward pressure of the finger C (Fig. 2) is released, and the spring 17 moves the panel 15 slightly upwardly. But the arm 31 cannot move upwardly, on account of the engagement of the pin 20 in the notch 26. So there is a relative movement between the parts 15 and 31, thereby raising the mirror fulcrum 29 relative to the arm 31, so that the arm 31 presses the pin 32 rearwardly farther from the panel 15 to the position shown in Fig. 3, swinging the mirror frame 33 on its axis or hinge 29 until a stop 34 of the mirror frame comes into contact with the rear side of the panel. In this position of the parts, which is illustrated in Fig. 3, the optical center of the mirror 28 is located in line with the horizontal optical axis of the magnifying lens 13, and the mirror is tilted at approximately 45 degrees to such axis, so that when the operator places his eye in the position G of Fig. 3, in line with the optical axis of the magnifier 13, he will see reflected from the mirror 28 a magnified image of the central part of the focusing screen 2, which will enable him to tell whether the camera is properly focused upon the principal object in the field of view, and will enable him to focus the camera properly if it is not already in focus. Because of its action in controlling the swinging of the mirror 28 relative to the panel 15, the member 31, 19 may be conveniently called a control member.

The distance between the direct view finder aperture 12 and the magnifying lens 13 is relatively slight, as seen in Fig. 3, so the operator may shift his eye easily and quickly back and forth between the positions D and G indicated in Fig. 3, merely by a slight tilt of the head in most cases. If it is desired to place the apertures 12 and 13 even closer to each other for even easier and quicker shifting of the eye from one position to the other, this may be done by raising the center of the lens 13 upwardly closer to the bottom of the aperture 12, in which case the line of sight from the lens 13 to the mirror 28 would be slightly downwardly instead of horizontal, and the stop 34 for determining the position of the mirror 28 will be so formed that the mirror tilts at a slightly greater angle on its hinge 29, so that when looking down the slanting line of sight, the operator still views the focusing screen 2 approximately at its center, in the desired manner.

When the direct view finder is no longer required, the panel 15 is folded upwardly and forwardly into closing relation to the aperture 14 in the front wall 3, in the manner already described, and when this folding movement is taking place, the arm 31 automatically releases the pressure on the pin 32 so that the spring 30 swings the mirror frame 33 back to its normal ineffective position lying close against and parallel to the rear side of the panel 15, as best seen in Fig. 2.

The word aperture is used in this application in a broad optical sense, rather than in its common or popular sense, and is intended to include any window or opening which will admit the desired light, even though such window may not be an opening in the physical sense and may be covered or obstructed by a transparent sheet of glass or the like, or by a lens such as 9 or 13.

Terms of direction or position such as top, bottom, horizontal, etc., are used merely for convenience of description and refer to the camera when it is used in normal or common position, right side up and pointed horizontally forwardly. Obviously the camera may be used in various other positions, tilted sideways or tilted upwardly or downwardly, etc.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera focusing hood arranged for use both in downward viewing of a focusing screen below said hood and as a horizontal direct view finder, said hood comprising walls including a front wall having a direct view finder aperture therein and a rear wall also having a direct view finder aperture therein and a focus observation aperture below said direct view finder aperture, a closure panel for closing said aperture in the front wall when said hood is used for downward viewing, said panel being mounted to swing downwardly and rearwardly about an axis near its lower edge to an open viewing position inclined upwardly and rearwardly from said axis and lying below the line of sight from the rear finder aperture to the front aperture when said hood is used as a direct view finder, and a mirror pivotally mounted in rear of said closure panel and movable bodily therewith when said closure panel is swung from its closed position to its viewing position, characterized by spring means tending to swing said closure panel upwardly from said open viewing position toward front wall closing position, a control member mounted for limited movement relative to both said closure panel and said mirror, latching means serving, when in effective latched position, to resist upward movement of said control member and thereby to limit upward swinging of said closure panel under the influence of said spring means, and interengaging parts on said mirror and said control member for tilting said mirror relative to said panel when said closure panel is moved downwardly with said control member to place said latching means in its effective latched position and is then released, from a position in which said mirror is approximately parallel to said closure panel, to a position in which said mirror is at a substantial angle to said closure panel effective to reflect rays of light from a focusing screen below said hood backwardly through said observation aperture in the rear wall of said hood.

2. A structure as defined in claim 1, in which said latching means includes a member associated with said front wall and having a slot therein, a link associated with said closure panel and having a pin engaged in said slot to slide along said slot, and a notch at one side of said slot in position to engage said pin to restrain upward motion of said link.

3. A structure as defined in claim 2, further characterized by means for releasing said latching means including a pivotally mounted cover plate for said hood, and means connected to said cover plate and effective upon predetermined pivotal movement thereof for displacing said pin from said notch so that said pin may move along said slot.

4. A structure as defined in claim 3, in which said means connected to said cover plate comprises a second link pivotally connected near one end to said cover plate and having near its other end a pin engaged in and movable along said slot, and having intermediate its ends a cam surface effective, upon downward swinging movement of said cover plate, to displace said pin of said first-mentioned link from said notch.

5. A structure as defined in claim 4, in which said second link has a notch in the path of travel of said pin of said first-mentioned link and so arranged that as said closure panel moves to viewing position, said pin of said first-mentioned link engages in said notch of said second link and actuates said second link to swing said cover plate partially downwardly.

6. A photographic camera focusing hood structure for use in surrounding and surmounting relation to a substantially horizontal focusing screen, said hood structure including a rear wall having a lower and an upper sight aperture therein, a front wall having an aperture therein, a closure panel for closing said aperture in the front wall, said panel being pivotally mounted on the front wall to swing downwardly and rearwardly about an axis near the lower edge of the panel, first spring means tending to swing the panel upwardly and forward to closed position, a mirror pivotally mounted on the rear of the panel and faced away from the panel, said mirror also being capable of swinging from a position approximately parallel to the panel to another position oblique to the panel, the pivotal axis of said mirror moving bodily upwardly and downwardly with the panel, second spring means tending to move said mirror to its approximately parallel position relative to the panel, a control member movable bodily upwardly and downwardly with the swinging movement of the panel and also movable through a limited range of movement relative to the panel, said control member engaging a portion of said mirror in a direction tending to swing it against the force of its second spring means, and means for holding said control member against upward movement, the parts being so related to each other that when said panel is swung rearwardly and downwardly below a line joining the lower edge of the aperture in the front wall to the lower edge of the upper aperture in the rear wall and released, and when said control member is held against upward movement, said first spring means will swing said panel upwardly to a limited extent relative to said control member and will carry the pivotal axis of the mirror upwardly relatively to said control member, and the engagement of said control member with said mirror will thereby swing said mirror against the force of said second spring means, to an oblique position in which said mirror will reflect light rays coming upwardly from said focusing screen so that they will pass rearwardly through said lower sight aperture in the rear wall, said upper aperture in the rear wall in combination with said aperture in the front wall forming a direct view finder when said panel is swung downwardly and rearwardly.

HERMANN BRETTHAUER.

References Cited in the file of this patent

FOREIGN PATENTS

| Number | Country | Date |
| --- | --- | --- |
| 610,775 | Germany | Mar. 18, 1935 |
| 656,817 | Germany | Feb. 15, 1938 |
| 662,617 | Germany | July 18, 1938 |
| 675,275 | Germany | May 4, 1939 |
| 688,660 | Germany | Feb. 27, 1940 |